United States Patent
Raposo et al.

(10) Patent No.: US 12,070,157 B2
(45) Date of Patent: Aug. 27, 2024

(54) GREASE TRAP

(71) Applicant: SHARKNINJA OPERATION LLC, Needham, MA (US)

(72) Inventors: Danny Martins Raposo, Lincoln, RI (US); Christopher T. Martin, North Attleboro, MA (US); Joshua D. Anthony, North Billerica, MA (US); John Benoit, Chestnut Hill, MA (US)

(73) Assignee: SHARKNINJA OPERATION LLC, Needham, MA (US)

( * ) Notice: Subject to any disclaimer, the term of this patent is extended or adjusted under 35 U.S.C. 154(b) by 516 days.

(21) Appl. No.: 17/138,383

(22) Filed: Dec. 30, 2020

(65) Prior Publication Data

US 2022/0202238 A1 Jun. 30, 2022

(51) Int. Cl.
*A47J 37/06* (2006.01)
*F24C 7/06* (2006.01)
*F24C 15/14* (2006.01)
*F24C 15/32* (2006.01)

(52) U.S. Cl.
CPC ......... *A47J 37/067* (2013.01); *A47J 37/0641* (2013.01); *F24C 7/067* (2013.01); *F24C 15/14* (2013.01); *F24C 15/325* (2013.01)

(58) Field of Classification Search
None
See application file for complete search history.

(56) References Cited

U.S. PATENT DOCUMENTS

| | | | |
|---|---|---|---|
| 6,220,149 B1 | 4/2001 | Lin | |
| 2004/0112852 A1* | 6/2004 | Brooks | A47F 5/14 211/153 |
| 2005/0189341 A1 | 9/2005 | Lin et al. | |
| 2006/0151468 A1 | 7/2006 | Kang et al. | |
| 2014/0290498 A1 | 10/2014 | Xu | |
| 2014/0360383 A1* | 12/2014 | Hamlin | A47J 37/0786 99/340 |
| 2015/0335200 A1 | 11/2015 | Ortner | |
| 2016/0022090 A1* | 1/2016 | Atlaw et al. | A47J 37/06 |
| 2019/0110641 A1* | 4/2019 | Lee et al. | A47J 37/06 |
| 2020/0352385 A1 | 11/2020 | Home | |

FOREIGN PATENT DOCUMENTS

| | | | | |
|---|---|---|---|---|
| CN | 106419613 A | * | 2/2017 | ......... A47J 37/0611 |
| EP | 2745756 A1 | | 6/2014 | ............... A47J 37/10 |
| KR | 20100046318 A | * | 5/2010 | ............. A47J 37/067 |
| WO | WO 8700410 A1 | * | 1/1987 | ............... A47J 37/04 |

OTHER PUBLICATIONS

Machine translation of KR 20100046318 A performed on Mar. 6, 2023, Heo (Year: 2010).*

(Continued)

*Primary Examiner* — Dana Ross
*Assistant Examiner* — Kevin Guanhua Wen
(74) *Attorney, Agent, or Firm* — Mintz, Levin, Cohn, Ferris, Glovsky and Popeo, P.C.

(57) ABSTRACT

A grill plate includes a body having a top surface for supporting food, a grease trap associated with said body, a cavity defined by said grease trap, and an opening to said cavity disposed proximate said top surface.

17 Claims, 8 Drawing Sheets

(56) References Cited

OTHER PUBLICATIONS

Machine translation of CN 106419613 A performed on Mar. 6, 2023, Couch et al. (Year: 2017).*
International Search Report received for PCT Patent International Application No. PCT/US2021/064486, mailed on Apr. 13, 2022, 11 pages.
Partial Supplementary European Search Report received for European Patent Application No. 21916225.2, mailed on Apr. 10, 2024, 15 pages.

* cited by examiner

GREASE TRAP

BACKGROUND

Embodiments of the present disclosure relate generally to a grill plate for a cooking system, and more specifically, to a grease trap for the grill plate.

SUMMARY

According to an embodiment, a grill plate is provided. The grill plate includes a body having a top surface for supporting food, a grease trap associated with said body, a cavity defined by said grease trap, and an opening to said cavity disposed proximate said top surface.

In addition to one or more of the features described above, or as an alternative, in further embodiments said grease trap is affixed to said body.

In addition to one or more of the features described above, or as an alternative, in further embodiments said body and said grease trap are formed as a single piece comprising a unitary structure.

In addition to one or more of the features described above, or as an alternative, in further embodiments said opening is disposed in said top surface and said opening opens up into said cavity.

In addition to one or more of the features described above, or as an alternative, in further embodiments including a plurality of ribs extending from said top surface of said body, each of said plurality of extension ribs being spaced apart from one another to define a plurality of channels formed between adjacent ribs of said plurality of ribs.

In addition to one or more of the features described above, or as an alternative, in further embodiments said top surface is angled towards said opening.

In addition to one or more of the features described above, or as an alternative, in further embodiments said body includes four sides. Said four sides including a first side, a second side located opposite said first side, a third side interposed between said first side and said second side, and a fourth side located opposite said third side and interposed between said third side and said first side, wherein said plurality of ribs extend between said first side and said second side, said plurality of ribs extending about parallel to said third side and said fourth side.

In addition to one or more of the features described above, or as an alternative, in further embodiments each of said plurality of ribs end at a first distance away from said first side forming a ribless area in said top surface that extends from said first side to said first distance away from said first side, wherein said opening is located in said ribless area.

In addition to one or more of the features described above, or as an alternative, in further embodiments said opening is located at said first side.

In addition to one or more of the features described above, or as an alternative, in further embodiments including at least one handle.

In addition to one or more of the features described above, or as an alternative, in further embodiments including a cover configured to fit within said grease trap, creating a removable cavity therein.

In addition to one or more of the features described above, or as an alternative, in further embodiments said cover includes a top portion that extends across an entirety of said opening and includes a slit on said top portion.

In addition to one or more of the features described above, or as an alternative, in further embodiments said cover includes a top portion located at said opening, and wherein said cover extends partially across said opening.

In addition to one or more of the features described above, or as an alternative, in further embodiments including one or more grooves in said top surface at least partially surrounding said opening, wherein said cover further comprises one or more rails configured to interlock with said one or more grooves.

In addition to one or more of the features described above, or as an alternative, in further embodiments including a cover configured to fit within said grease trap, said cover being removably coupled to the grill plate, wherein said cover extends across an entirety of said opening, includes a side portion, and includes an orifice on said side portion, said orifice being aligned with at least one of said plurality of channels.

In addition to one or more of the features described above, or as an alternative, in further embodiments including a grill extension cover configured to fit on top of said opening of said grease trap.

In addition to one or more of the features described above, or as an alternative, in further embodiments including a plurality of extension ribs extending from a top extension surface of said grill extension cover, each of said plurality of extension ribs being spaced apart from one another to define a plurality of extension channels formed between adjacent ribs of said plurality of extension ribs.

In addition to one or more of the features described above, or as an alternative, in further embodiments said plurality of extension ribs align with said plurality of ribs.

In addition to one or more of the features described above, or as an alternative, in further embodiments a gap is present between said top surface of the grill plate and said top extension surface of said grill extension cover.

In addition to one or more of the features described above, or as an alternative, in further embodiments a gap is present between said plurality of extension ribs and said plurality of ribs.

In addition to one or more of the features described above, or as an alternative, in further embodiments a gap is present between said plurality of extension channels and said plurality of channels.

According to an embodiment, a cooking system is provided. The cooking system includes a housing having a hollow interior, a grill plate configured to fit within said hollow interior, and a heating element associated configured to heat said grill plate, said grill plate including a first surface and a second surface, wherein said first surface receives heat from said heating element at a greater intensity than said second surface.

In addition to one or more of the features described above, or as an alternative, in further embodiments said heating element is a convective heater associated with a fan, said second surface being disposed a greater distance from said convective heater than said first surface.

In addition to one or more of the features described above, or as an alternative, in further embodiments including a cover disposed between said heating element and said second surface.

In addition to one or more of the features described above, or as an alternative, in further embodiments said second surface is disposed below and at least a partially horizontally offset position from said first surface, said first surface including a declined slope down towards said second surface.

In addition to one or more of the features described above, or as an alternative, in further embodiments said first surface receives heat from said heating element at a greater intensity than said second surface while said heating element is outputting a consistent level of heat.

According to an embodiment, a grill plate is provided. The grill plate includes a body comprising a top surface for supporting food, said top surface including a first portion and a second portion, said second portion of said top surface being removable from said first portion, and an opening in said top surface between said first portion and said second portion.

In addition to one or more of the features described above, or as an alternative, in further embodiments said opening leads to a grease trap surface of a grease trap, the grease trap surface being disposed below the top surface.

In addition to one or more of the features described above, or as an alternative, in further embodiments said first portion and second portion include grilling ribs.

In addition to one or more of the features described above, or as an alternative, in further embodiments said grilling ribs on said first portion and said second portion are aligned with each other.

In addition to one or more of the features described above, or as an alternative, in further embodiments said grilling ribs on said first portion are aligned but spaced from said grilling ribs on said second portion.

In addition to one or more of the features described above, or as an alternative, in further embodiments said first portion slopes towards said second portion.

In addition to one or more of the features described above, or as an alternative, in further embodiments said second portion is a cover that partially covers said opening to said grease trap.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 1:
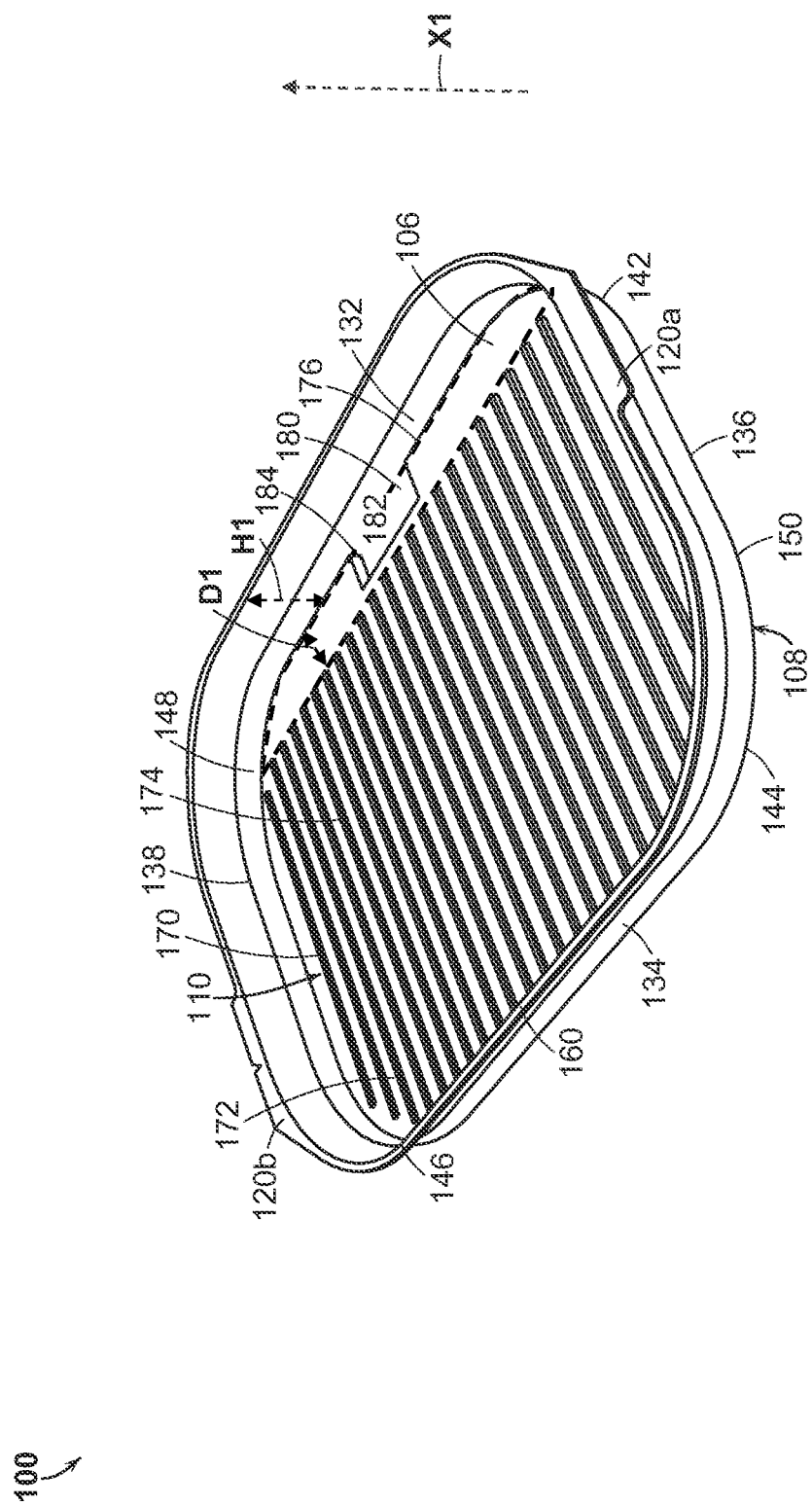
FIG. 1 is a perspective top view of a grill plate with a grease trap, according to an embodiment of the present disclosure.

With reference now to the FIG. 1, a grill plate 100 is illustrated in accordance with an embodiment of the present disclosure. The grill plate 100 may be utilized in a cooking system 20 (See FIGS. 11 and 12) or any other cooking system known to one of skill in the art.

The grill plate 100 includes a body 106 that has a lower surface 108 and a top surface 110 opposite the lower surface 108. The top surface 110 is designed to receive and retain one or more consumable products, such as food products for example, thereon. Examples of food products suitable for use with the grill plate 100, include but are not limited to, meats, fish, poultry, bread, rice, grains, pasta, vegetables, fruits, and dairy products, among others.

The grill plate 100 may be a formed from any suitable heat conducting material, such as, for example, ceramic, metal, steel, aluminum, iron, cast iron, die cast aluminum material, or any suitable material capable of withstanding the high temperatures required for cooking food products. Further, in some embodiments, at least a portion of the grill plate 100 may be coated with a non-stick material, such as Teflon for example, to prevent food items from sticking to the grill plate 100.

The grill plate 100 may have a rounded rectangle shape, as illustrated in FIG. 1. The rounded rectangle shape may be defined as a rectangular shape having four sides 132, 134, 136, 138 with four rounded corners 142, 144, 146, 148. The grill plate 100 or more specifically the body 106 of the grill plate 100 includes four sides 132, 134, 136, 138 extending between the top surface 110 and the lower surface 108. The four sides 132, 134, 136, 138 include a first side 132, a second side 134 located opposite the first side 132, a third side 136 interposed between the first side 132 and the second side 134, and a fourth side 138 located opposite the third side 136. The first side 132 may be about equivalent in length to the second side 134 and the third side 136 may be about equivalent in size to the fourth side 138. The first side 132 and the second side 134 may be longer than the third side 136 and the fourth side 138, as illustrated in FIG. 1.

The grill plate 100 or more specifically the body 106 of the grill plate 100 includes a first rounded corner 142, a second rounded corner 144, a third rounded corner 146 located opposite the first rounded corner 142, and a fourth rounded corner 148 located opposite the second rounded corner 144.

The first rounded corner 142 connects the first side 132 with the third side 136. The second rounded corner 144 connects the third side 136 with the second side 134. The third rounded corner 146 connects the second side 134 with the fourth side 138. The fourth rounded corner 148 connects the fourth side 138 with the first side 132. The first side 132, the first round corner 142, the third side 136, the second round corner 144, the second side 134, the third round corner 146, the fourth side 138, and the fourth round corner 148 form a perimeter 150 of the body 106 of the grill plate 100.

The grill plate 100 further includes a sidewall 160 that extends away from the top surface 110 to a first height H1 in a first direction X1 away from the body 106. The sidewall 160 extends around the perimeter 150. The sidewall 160 at least partially encloses the top surface 110. Advantageously, by partially enclosing the top surface 110 with the sidewall 160, the sidewall 160 helps trap in heat for the top surface 110 when cooking. The sidewall 160 may flair outward from the base 106 at a selected angle.

A plurality of ribs 170 extend from the top surface 110 of the body 106 in the first direction X1, as illustrated in FIG. 1. The ribs 170 are grilling ribs. The ribs 170 are spaced apart from one another to define a plurality of channels 172 formed between adjacent ribs 170. The ribs 170 may be integrally formed with the top surface 110. Accordingly, when one or more food items are positioned on the food supporting surface 174 defined by the ribs 170, the food is offset from the top surface 110 of the body 106. Each of the plurality of ribs 170 may be identical, or alternatively, may vary in size or shape based on the position of the rib 170 relative to the body 102.

At least one handle 120a, 120b may be associated with the grill plate 100 to allow a user to easily grasp and manipulate the grill plate 100. In the illustrated, non-limiting embodiment, the grill plate 100 has two handles 120a, 120b extending from the sidewall 160 on opposing sides of the grill plate 100. In one embodiment, a first handle 120a may extend from the sidewall 160 at the third side 136 of the grill plate 100 and a second handle 120b may extend from the sidewall 160 at the fourth side 138 of the grill plate 100. In one embodiment, the first handle 120a may extend from the sidewall 160 at the third side 136 and the first rounded corner 142 and the second handle 120b may extend from the sidewall 160 at the fourth side 138 and the third rounded corner 146. Although the handles 120a, 120b are illustrated as being integrally formed with the grill plate 100, embodiments where the one or more handles 120a, 120b are affixed to the grill plate 100 are also within the scope of the disclosure.

The ribs 170 may extend between the first side 132 and the second side 134 of the grill plate 070, as shown in FIG. 1. The ribs 170 may extend about parallel or parallel with the third side 136 and the fourth side 138 of the grill plate 100, as shown in FIG. 1. The ribs 170 may extend between the first side 132 and the second side 134 of the grill plate 170 and end at a first distance D1 away from the first side 132 forming a ribless area 176 in the top surface 110, as shown in FIG. 1. Thus, the ribless area 176 (i.e., an area with no ribs 170) extends from the first side 132 to the first distance D1 away from the first side 132. The ribless area 176 may also extend from the first rounded corner 142 to the fourth rounded corner 148, as illustrated in FIG. 1.

The grill plate 100 includes a grease trap 180 located proximate or at the first side 132. The grease trap includes a cavity 182 and an opening 184. The opening 184 of the grease trap 180 is located proximate or at the first side 132. The grease trap 180 may be integrally formed with or affixed to the body 106. In an embodiment, the body 106 and the grease trap 180 are formed as a single piece comprising a unitary structure. Therefore, the grill plate 100 and the grease trap 180 may be composed of the same material. The grease trap 180 may be formed from any suitable heat conducting material, such as, for example, ceramic, metal, steel, aluminum, iron, cast iron, die cast aluminum material, or any suitable material capable of withstanding the high temperatures required for cooking food products.

The grease trap 180 forms a cavity 182 therein to capture grease, oil, and other runoff liquids generated during a cooking operation. The opening 184 is formed in the top surface 110 of the body 106, and opens up into the cavity 182 of the grease trap 180 allowing any liquids generated during cooking may flow through the opening 184 into the cavity 182. In other words, the opening 184 provides an access point to the cavity 182 for liquids generated during cooking. The opening 184 may be located between first side 132 and the first distance D1 away from the first side 132. The top surface 110 may be angled or sloped down towards ribless area 176 and/or the opening 184 to help direct any liquids or materials generated during cooking to flow into the opening 184 into the cavity 182. The opening 184 is located within a ribless area 176, as illustrated in FIG. 1. The opening 184 may extend across a portion of the ribless area 176, an entirety of the ribless area 176, or anywhere therebetween. The opening 184 may be rectangular in shape, as illustrated in FIG. 1, but it is understood that the embodiments disclosed herein may be applicable openings of any shape.

Figure 2:
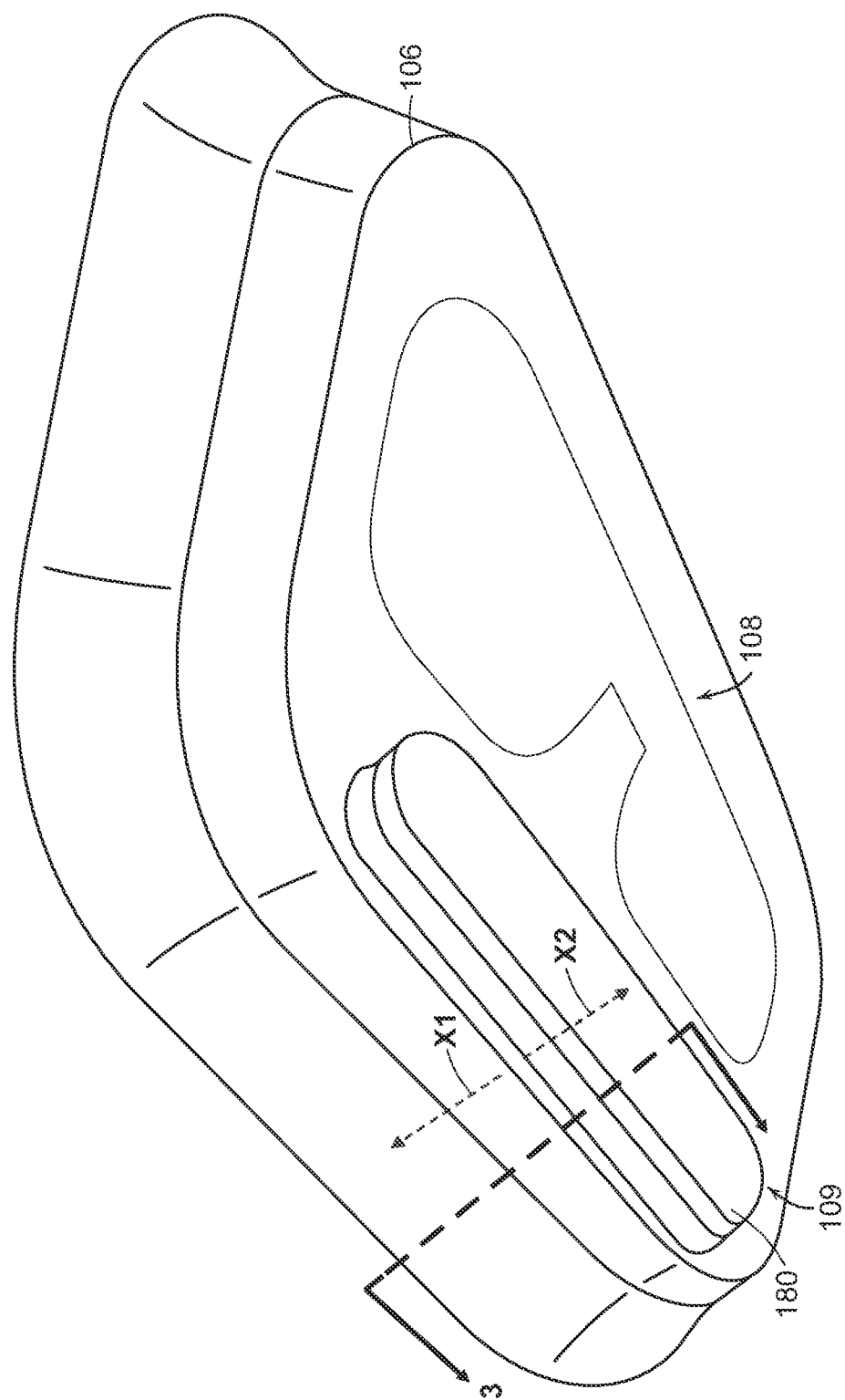
FIG. 2 is a perspective bottom view of the grill plate, according to an embodiment of the present disclosure.
Figure 3:
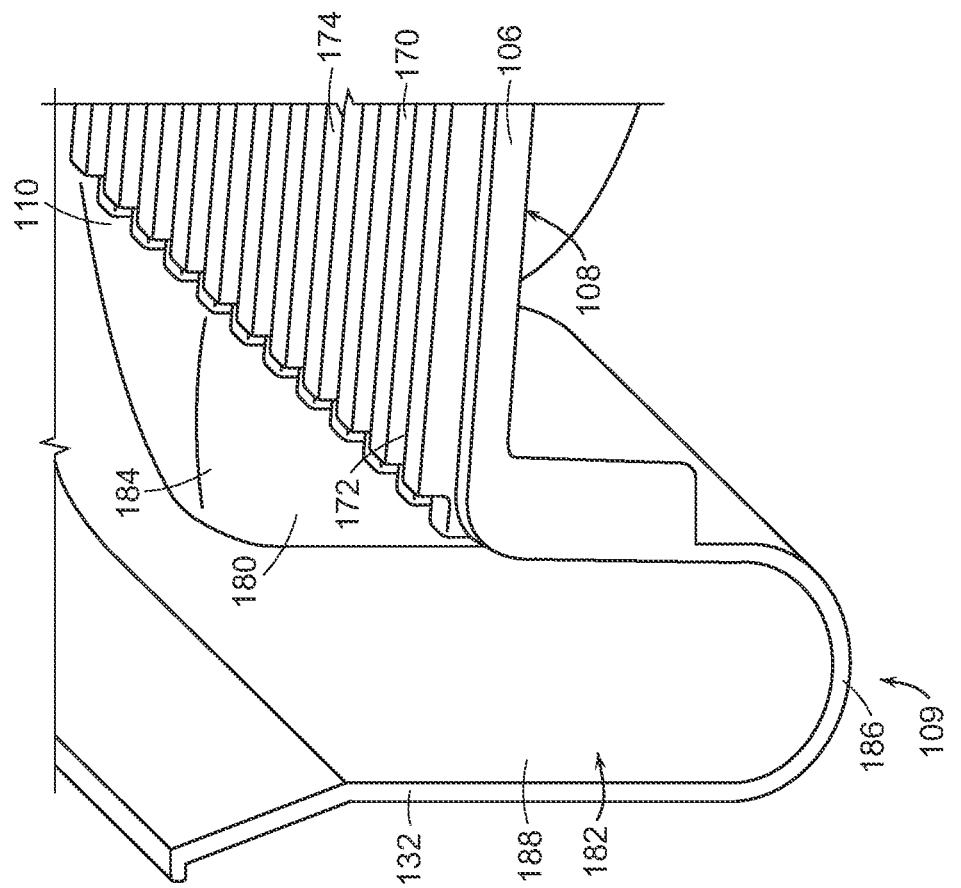
FIG. 3 is a cross-sectional view of the grill plate, according to an embodiment of the present disclosure.

Referring now to FIGS. 2 and 3, a bottom perspective view of the grill plate 100 is illustrated in FIG. 2 and a cross-sectional view of the grill plate 100 is illustrated in FIG. 3, in accordance with an embodiment of the present disclosure. The grease trap 180 expands in a second direction X2 opposite the first direction X2, as illustrated in FIGS. 2 and 3. The expansion of the grease trap 180 in the second direction X2 may create a bump 109 in the lower surface 108 of the body 106.

The opening 184 of the grease trap 180 may be filleted to aid in manufacture of the grill plate 100 and aid in directing the flow of any liquids generated during cooking into the cavity 182. The cavity 182 of the grease trap 180 may be formed by one or more cavity walls 188 and a grease trap surface 186. The cavity walls 188 may connect the opening 184 of the grease trap 180 to the grease trap surface 186 of the grease trap 180. The grease trap surface 186 of the grease trap 180 may be rounded or U-shaped, as illustrated in FIG. 3. In an embodiment, a cavity wall 188 of the grease trap 180 is at the first side 132 of the body 106.

The food supporting surface 174 (i.e., first surface) is offset with the grease trap surface 186 (i.e., second surface). The grease trap surface 186 is disposed below and at least a partially horizontally offset position from the foot supporting surface 174. The food supporting surface 174, the ribs 170, and/or the channels 172 may include a declined slope down towards the grease trap surface 186.

the grease trap surface 186 is disposed a greater distance from a heating element 82 (see FIG. 12) than the food supporting surface 174 and therefore the food supporting surface 174 receives heat from the heating element at a greater intensity than the grease trap surface 186 while the heating element 82 is outputting a consistent level of heat. Advantageously, since the grease trap surface 186 receives heat from the heating element at a lower intensity than the food supporting surface 174, this helps liquid and food particulate (e.g., grease) being stored in the grease trap 180 from flaring up as it is receiving less heat from the heating element 82.

Referring now to FIGS. 4, 5, 6, and 7, a top perspective view of the grill plate 100 (FIG. 4) and a cross-sectional view of the grease trap 180 (FIGS. 5, 6, and 7) are shown in accordance with another embodiment of the present disclosure. As shown, the grill plate 100 may include a cover 200 configured to fit within the grease trap 180 creating a removable cavity therein. An area of the grill plate with ribs 170 may be referred to as a first portion of the top surface 110 and the cover 200 may be referred to as a second portion of the top surface 110. The cover 200 may conform to the shape of the grease trap 180.

Advantageously, cover 200 may be placed within the grease trap 180 to capture any liquids generated during cooking and then the cover 200 may be removed following cooking to easily dispose of the liquids, which makes for easy cleanup. A compartment 220 is formed within the cover 200 to capture and maintain the liquid generated during cooking. The cover 200 may be composed a heat resistant material, such as, for example, silicon or any other heat resistant material known to one of skill in the art. The cover 200 is disposed between a heating element 82 (see FIG. 12) the grease trap surface 186. Advantageously, since the cover 200 is disposed between the heating element 82 and the grease trap surface 186, the cover 200 may block any liquid or grease in the grease trap 180 from hitting heating element 82. Also, advantageously, the cover 200 block heat generated by the heating element 82 from directly hitting the grease in the grease trap 180, which avoids generating smoke.

Figure 5:
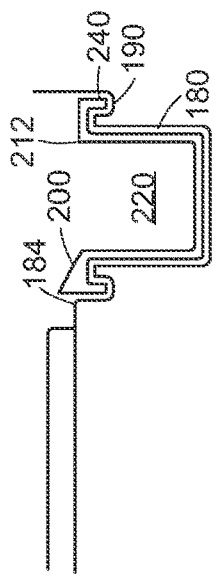
FIG. 5 is a cross-sectional view of the grill plate, the grease trap, and the cover, according to an embodiment of the present disclosure.
Figure 6:
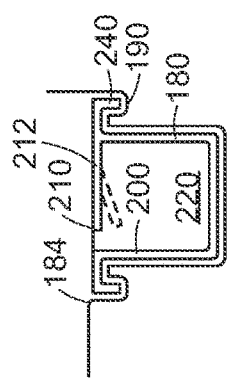
FIG. 6 is a cross-sectional view of the grill plate, the grease trap, and the cover, according to an embodiment of the present disclosure.
Figure 7:
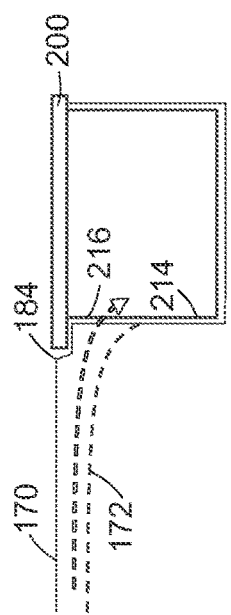
FIG. 7 is a cross-sectional view of the grill plate, the grease trap, and the cover, according to an embodiment of the present disclosure.
Figure 4:
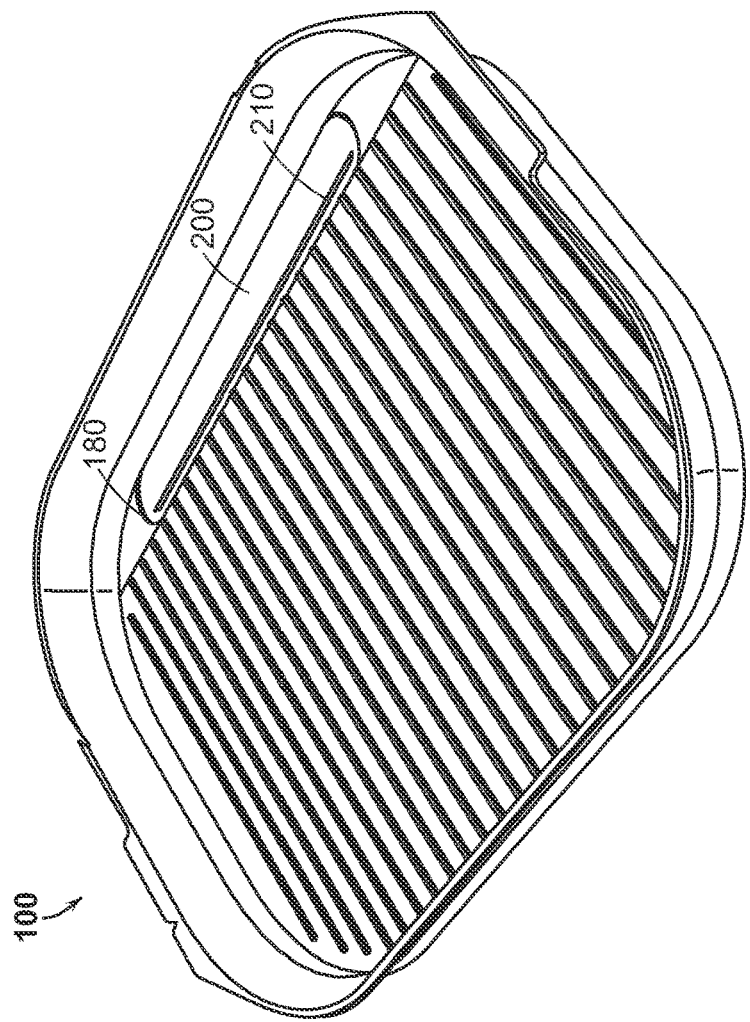
FIG. 4 is a perspective top view of a grill plate with a cover for the grease trap, according to an embodiment of the present disclosure.

The cover 200 includes a top portion 212 that may extend across a portion of the opening 184 of the grease trap 180, or an entirety of the opening 184 of the grease trap 180. The cover 200 may extend partially across the opening 184. As illustrated in FIGS. 4 and 6, the top portion 212 of the cover 200 extends across an entirety of the opening 184 of the grease trap 180 and include a slit 210 in the top portion 212 of the cover 200 to allow liquids generated during cooking to flow into the cover 200. The top portion 212 of the cover 200 being located at or proximate the opening 184. As illustrated in FIG. 5, the cover 200 does not expand across the opening 184 of the grease trap 180 but rather is open at the top portion 212 to allow liquids generated during cooking to flow into the cover 200. The top portion 212 may be located at the opening 184. As illustrated in FIG. 7, the cover 200 expands across an entirety (i.e., all) of the opening 184 of the grease trap 180 and includes one or more orifices 216 in a side portion 214 of the cover 200 to allow liquids generated during cooking to flow into the cover 200. The one or more orifices 216 may be aligned with at least one of the plurality of channels 172 between ribs 170. The one or more orifices 216 are fluidly connected with at least one of the plurality of channels 172 between ribs 170. The liquid will flow directly from the channel 172 through the one or more orifices 216 and into the compartment 220 of the cover 200. The orifices 216 may or may not extend across a length of the cover 200.

The cover 200 may be configured to rest within the grease trap 180 or configured to be releasably attached to the grill plate 100. The cover 200 may include one or more rails 240 (anchors) that are configured to interlock with one or more grooves 190 in the top surface 110 of the grill plate 100. The one or more grooves 190 may at least partially surround the opening 184. In an embodiment, the one or more groove 190 may fully surround the opening 184 forming a single groove.

Figure 8:
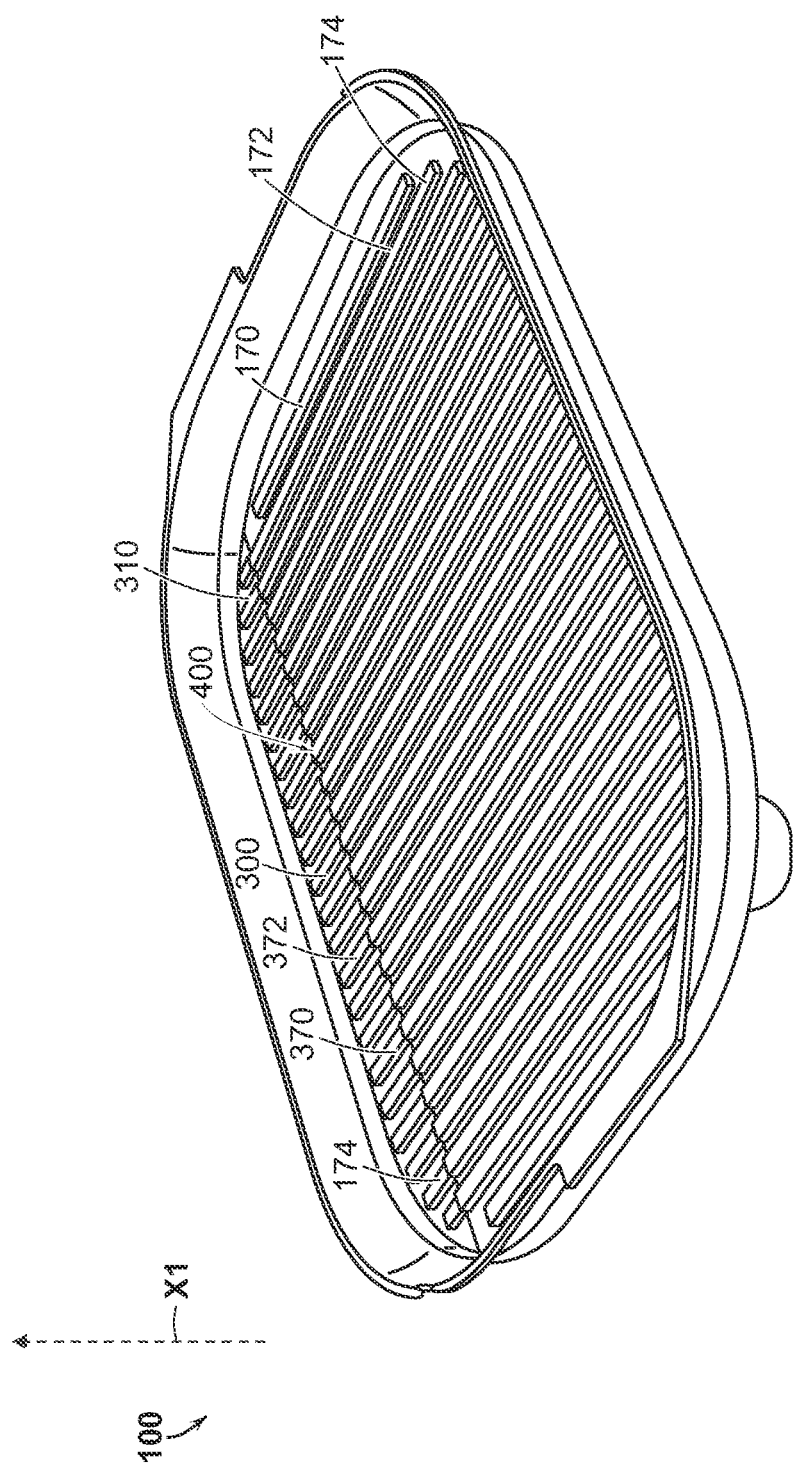
FIG. 8 is a perspective top view of a grill plate with the grease trap and a grill extension cover, according to an embodiment of the present disclosure.
Figure 9:
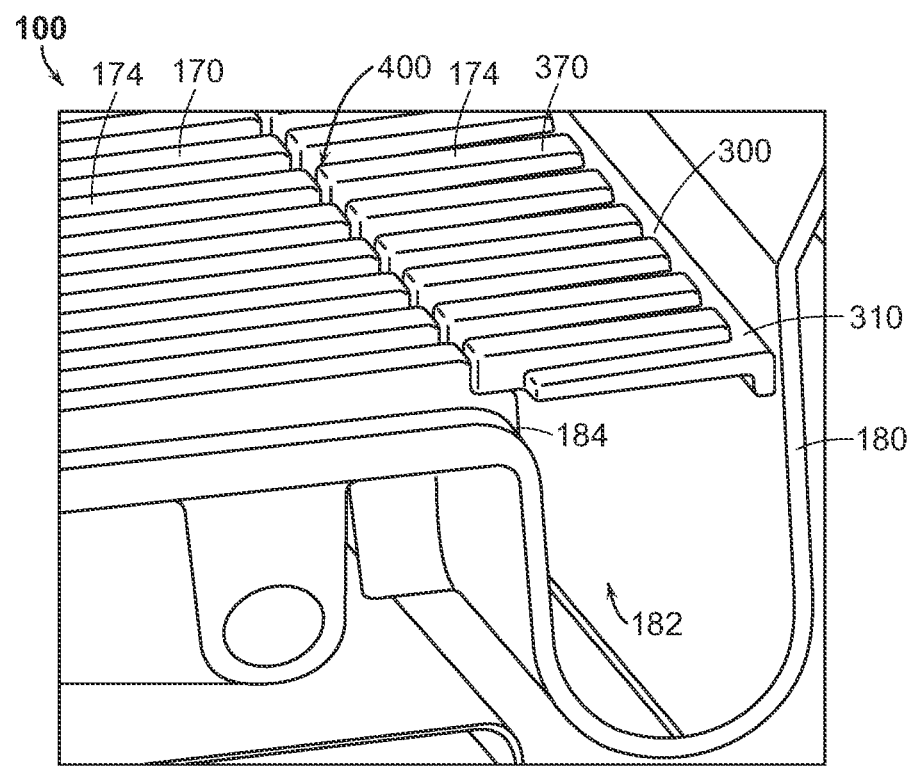
FIG. 9 is a cross-sectional view of a grill plate with the grease trap and the grill extension cover, according to an embodiment of the present disclosure.
Figure 10:
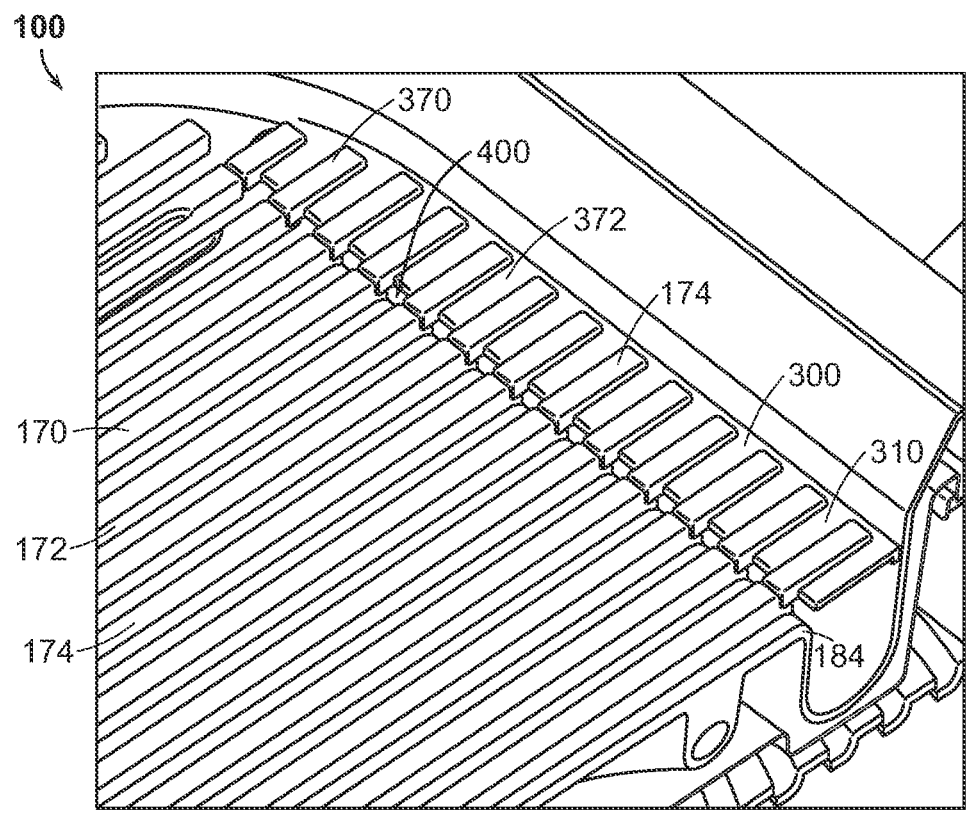
FIG. 10 is a cross-sectional view of a grill plate with the grease trap and the grill extension cover, according to an embodiment of the present disclosure.

Referring now to FIGS. 8, 9, and 10, a top perspective view of the grill plate 100 (FIG. 8) and a cross-sectional view of the grease trap 180 (FIGS. 9 and 10) are shown in accordance with another embodiment of the present disclosure. In this embodiment, the grill plate 100 includes a grill extension cover 300 configured to fit on top of the opening 184 of the grease trap 180. An area of the grill plate with ribs 170 may be referred to as a first portion of the top surface 110 and the grill extension cover 300 may be referred to as a second portion of the top surface 110. The grill extension cover 300 may be configured to fit in the ribless area 176 (see FIG. 1) and may be about the size of the ribless area 176. The grill extension cover 300 may be removably coupled, permanently affixed, or unitary to the grill plate 100. The grill extension cover 300 is disposed between a heating element 82 (see FIG. 12) the grease trap surface 186. Advantageously, since the grill extension cover 300 is disposed between the heating element 82 and the grease trap surface 186, the grill extension cover 300 may block any liquid or grease in the grease trap 180 from hitting heating element 82. Also, advantageously, the grill extension cover 300 blocks heat generated by the heating element 82 from directly hitting the grease in the grease trap 180, which avoids generating smoke.

The grill extension cover 300 includes a plurality of extension ribs 370. The extension ribs are grilling ribs. The plurality of extension ribs 370 may extend from a top extension surface 310 of the grill extension cover 300 in the first direction X1, as illustrated in FIG. 8. The extension ribs 370 are spaced apart from one another to define a plurality of extension channels 372 formed between adjacent extension ribs 370. The extension ribs 370 may be integrally formed with the top extension surface 310 of the grill extension cover 300. Accordingly, when one or more food items are positioned on the food supporting surface 174 defined by the ribs 170 and the extension ribs 370, the food is offset from the top surface 110 of the body 106 and the top surface 110 of the grill extension cover 300. Each of the plurality of extension ribs 370 may be identical, or alternatively, may vary in size or shape based on the position of the extension rib 370 relative to the grill extension cover 300. The top surface 110 may slope towards the grill extension cover 300.

The extension ribs 370 of the grill extension cover 300 line up or align with the ribs 170 of the grill plate 100 and the extension channels 372 of the grill extension cover 300 line up or align with the channels 172 of the grill plate 100. Advantageously, the grill extension cover 300 extends the food supporting surface 174 of the grill plate 100.

A gap 400 (i.e., opening or gap opening) may be present between the top surface 110 of the grill plate 100 and the top extension surface 310 of the grill extension cover 300. The gap 400 may fluidly connect the food supporting surface 174 and/or be in fluid communication with the cavity 182 of the grease trap 180. The gap 400 allows any liquids generated during cooking to flow through the gap 400 and the opening 184, and then into the cavity 182 of the grease trap 180. The gap 400 may be present between the channels 172 of the grill plate 100 and the extension channels 372 of the grill extension cover 300. The gap 400 may also be present between the extension ribs 370 of the grill extension cover 300 and the ribs 170 of the grill plate 100. Alternatively, the extension ribs 370 of the grill extension cover 300 may be touching the ribs 170 of the grill plate 100, while the gap 400 only exists between the channels 172 of the grill plate 100 and the extension channels 372 of the grill extension cover 300.

The cover 200 may expand across a portion of the opening 184 of the grease trap 180 or an entirety (i.e., all) of the opening 184 of the grease trap 180. As illustrated in FIGS. 4 and 6, the cover 200 expands across an entirety (i.e., all) of the opening 184 of the grease trap 180 and includes a slit 210 on a top portion 212 of the cover 200 to allow liquids generated during cooking to flow into the cover 200.

The grill extension cover 300 may be a formed from any suitable heat conducting material, such as, for example, ceramic, metal, steel, aluminum, iron, cast iron, die cast aluminum material, or any suitable material capable of withstanding the high temperatures required for cooking food products.

Figure 11:
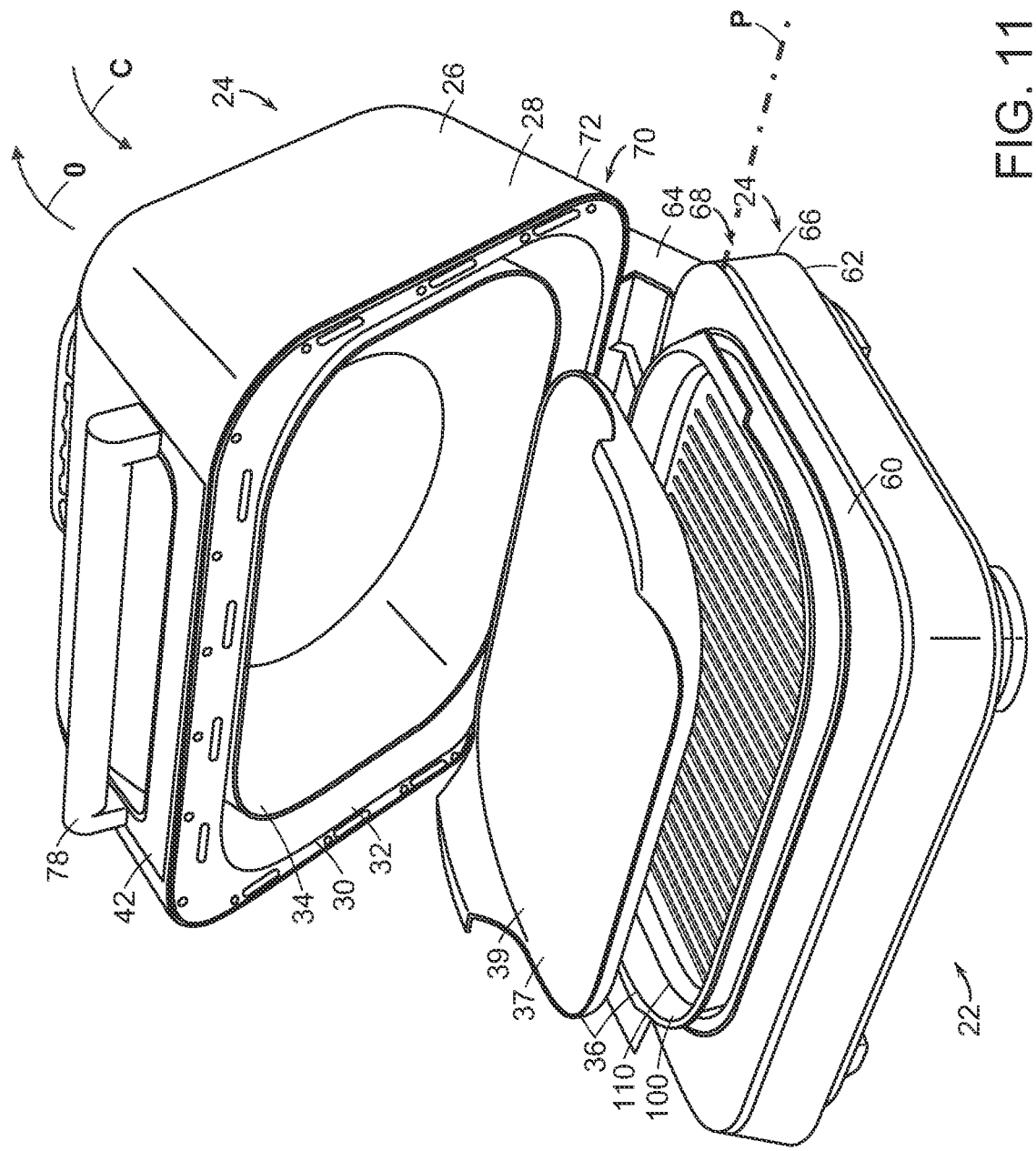
FIG. 11 is a front perspective view of the cooking system with the lid in an open position according to an embodiment of the present disclosure.

Referring now to FIG. 11 a cooking system 20 is illustrated, in accordance with an embodiment of the present disclosure. The grill plate 100 of FIGS. 1-10 may be utilized in the cooking system 20 of FIG. 11.

As shown, the cooking system 20 includes a base 22 and a lid 24. The lid 24 includes a housing 26 having an exterior, heat resistant or non-conductive surface 28 and an interior surface 30 that defines a hollow interior 32. The housing 26 may be made of any suitable material, such as glass, aluminum, plastic, or stainless steel for example.

A liner 34 may be disposed within the hollow interior 32 of the housing 26. The liner 34 may be formed from any suitable conductive material, such as aluminum for example. In an embodiment, as shown in FIG. 11, the liner 34 may be offset form the interior surface 30 of the housing 26. Alternatively, the liner 34 may form the interior surface 30 of the housing 26 and thereby defines the hollow interior 32 of the housing 26. However, it should be understood that other components of the cooking system 20, or surfaces thereof, may also define the hollow interior 32.

In an embodiment, a cooking surface 36 is receivable inside the hollow interior 32 defined by the liner 34. In an embodiment the cooking surface 36 may be a griddle plate 37 or the grill plate 100. The griddle plate 37 may rest upon the grill plate 100 and is removable from the base 22 and the grill plate 100. The grill plate 100 is configured to fit within the hollow interior 32 of the housing 26 and is removable from the interior 32 of the housing 26.

As aforementioned, the grill plate 100 has a top surface 110 designed to receive and retain one or more consumable products, such as food products for example, thereon. The griddle plate 37 has a griddle surface 39 designed to receive and retain one or more consumable products, such as food products for example, thereon. Examples of food products suitable for use with the cooking system 20, include but are not limited to, meats, fish, poultry, bread, rice, grains, pasta, vegetables, fruits, and dairy products, among others. The griddle plate 37 may be a formed from a ceramic, metal, or die cast aluminum material. However, any suitable material capable of withstanding the high temperatures required for cooking food products is contemplated herein.

A cooking volume may be defined between the interior 32 of the lid 24 and the cooking surface 36. An end of the closed lid 24 may be operable to engage the base 22, or alternatively. The lid 24 is configured to cover the cooking surface 36 and a top surface 60 of the base 22.

The lid 24 is movable relative to the base 22 between an open position and a closed position to selectively enclose the hollow interior 32. For example, the lid 24 may be distinct and separable from the base 22, or the lid 24 may be movably connected to the base 22. One or more fastening mechanisms (not shown) may but need not be used to secure the lid 24 to the base 22 when the lid 24 is in the closed position. Any suitable type of fastening mechanism capable of withstanding the heat associated with the cooking system 20 is considered within the scope of the disclosure.

In the illustrated, non-limiting embodiment, the lid 24 is pivotable or rotatable relative to the base 22 about a pivot axis P. As shown, the lid 24 may be rotatable about a pivot axis P positioned adjacent a lower surface 62 of the base 22. In some embodiments, the lid 24 includes a rigid pivot arm 64 positioned adjacent a back surface 66 of the base 22 and having a first end 68 connected to the base 22 about a pivot axis P. A second, opposite end 70 of the pivot arm 64 is connected to a back surface 72 of the lid 24. Accordingly, as the pivot arm 64 is rotated about the pivot axis P in a first direction, indicated by arrow O, the lid 24 is rotated away from or out of engagement with a top surface 60 of the base 22 to expose the hollow interior 32. Similarly, as the pivot arm 64 is rotated about the pivot axis P in a second direction, indicated by arrow C, the lid 24 is rotated toward or into engagement with the top surface 60 of the base 22 to seal or cover the cooking surface 36. By positioning the pivot axis P near a lower surface 62 of the housing 26, the sizing envelope of the cooking system 20 when the lid 24 is in the open position may be limited. However, in other embodiments, the pivot axis P and connection of the lid 24 to the base 22 may be arranged at or near the top surface 60 of the base 22.

In the illustrated, non-limiting embodiment, one or more handles 78 extend outwardly from a housing 26 of the lid 24 to provide a user with a location to easily grasp the lid 24 for movement between the open and closed position. Although a single handle 78 mounted generally near a front 42 of the lid 24 is shown, embodiments having multiple handles, or alternatively, no handles are also within the scope of the disclosure. The housing 26 and/or the one or more handles 78 may be integrally or separately formed, such as from a molded plastic material for example.

Figure 12:
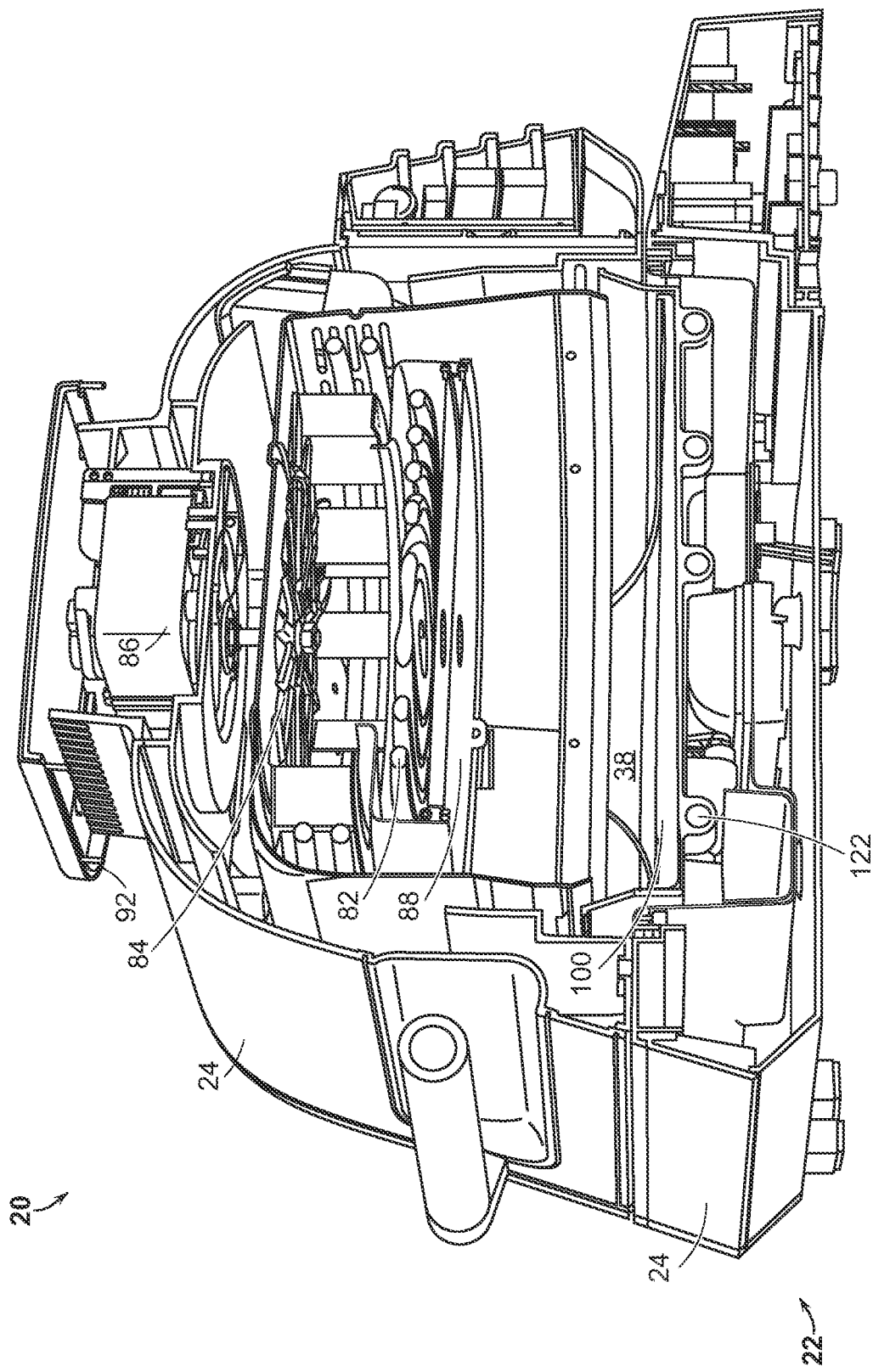
FIG. 12 is a cross-sectional view of the cooking system according to an embodiment of the present disclosure.

Referring now to FIG. 12, a cross-sectional illustration of the cooking system 20 is illustrated, in accordance with an embodiment of the present disclosure. The cooking system 20 includes at least one heating element 82 operable to impart heat to the cooking volume during one or more modes of operation of the cooking system 20. In the illustrated, non-limiting embodiment, the at least one heating element 82 is positioned generally at or above the grill plate 100. In the embodiment as shown the at least one heating element 82 is mounted within the lid 24, and therefore completely outside of the interior 38 of the grill plate 100, and vertically offset from the grill plate 100. However, it should be understood that a heating element located at any suitable location is within the scope of the disclosure.

The at least one heating element 82 may be capable of performing any suitable type of heat generation. For example, a heating element 82 configured to heat the grill plate 100 or one or more food items located within the interior 38 of the grill plate 100 via conduction, convection, radiation, and induction are all within the scope of the disclosure. In the illustrated, non-limiting embodiment, the heating element 82 is a convective heater, and the cooking system 20 additionally includes an air movement device 84, such as a fan for example, operable to circulate air within the cooking volume. The air is heated as it flows along its path of circulation, such as by flowing over a portion of the at least one heating element 82. In the illustrated, non-limiting embodiment, the air movement device 84 is driven by a motor 86 having a separate cooling mechanism coupled thereto. Further, the cooking system 20 may include a vent 92 for exhausting hot air generated by operation of at least one of the air movement device 84, the motor 86, and the separate cooling mechanism to the exterior of the cooking system 20. Although the vent 92 is illustrated as being formed in the lid 24, embodiments where the vent is formed in the base 22 of the cooking system 20 are also contemplated herein. In an embodiment, a guard 88 for restricting projectile matter, such as oil for example, from contacting the heating element 82 is positioned directly adjacent the heating element 82, between the heating element 82 and the interior 38 of the grill plate 100.

As previously mentioned, the grill plate 100 having a support surface 174 (see FIG. 1) for supporting food thereon is removably mounted within the cooking system 20. Because weight and cost are typically directly proportional, it is desirable to minimize the weight of the grill plate 100. As a result, the thermal mass of grill-like elements, such as burners used in a stove for example, are insufficient to achieve and maintain a temperature required to initiate the Maillard reaction, specifically when heated via convection or radiation. In an embodiment, the mass of the grill plate 100 is between about 200 grams and about 3 kg, and more specifically, between about 300 g and about 3 kg, about 400 grams and about 3 kg, about 500 g and about 3 kg, about 600 g and about 3 kg, about 700 g and about 3 kg, about 800 g and about 3 kg, about 900 g and about 3 kg, about 1000 g and about 3 kg, about 1.1 kg and about 3 kg, about 1.2 kg and about 3 kg, about 1.3 kg and about 3 kg, about 1.4 kg and about 3 kg, 1.5 kg and about 3 kg, 1.6 kg and about 3 kg, 1.7 kg and about 3 kg, 1.8 kg and about 3 kg, 1.9 kg and about 3 kg, 2.0 kg and about 3 kg, about 2.1 kg and about 3 kg, about 2.2 kg and about 3 kg, about 2.3 kg and about 3 kg, about 2.4 kg and about 3 kg, about 2.5 and about 3 kg, about 2.6 and about 3 kg, about 2.7 and about 3 kg, about 2.8 and about 3 kg, or about 2.9 kg and about 3 kg.

Food items may be positioned within the interior 38 of the grill plate 100, in direct contact with the support surface 174 of the grill plate 100 to perform a grilling operation. Heat from the grill plate 100, and more specifically from the ribs 170, is transferred to the food items, such as via conduction (i.e. contact cooking). Because the temperature of the grill plate 100 is above 285° F., and therefore the Maillard reaction occurs, browning in the form of grill or sear marks is formed at the surfaces of the food arranged in direct contact with the ribs 170 of the grill plate 100. It should be understood that in embodiments where only a portion of the ribs 170 form part of the diffusing structure, the ribs 170 that are not part of the diffusing structure are operable to transfer heat to the food. Further, the ribs 170 that define the diffusing structure transfer heat to the food.

The cooking system 20 may include another heating element 122 (see FIG. 13), distinct from the heating element 82, and operably coupled to the grill plate 100. The first and second heating elements 82, 122 are operable independently or in combination to apply one or more predetermined power settings to cook the food products within the grill plate 100. In an embodiment, the heating element 122 may be embedded within the base 22 and operably coupled to the grill plate 100 when the grill plate 100 is installed within cooking system 20.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system, comprising:
a housing;
at least one heating element disposed in the housing; and
a removable grill plate disposed in the housing and in thermal communication with the at least one heating element, the removable grill plate including
a plurality of primary ridges extending upward from the removable grill plate to define a primary cooking surface, the plurality of primary ridges defining a plurality of primary channels therebetween,
a grease trap defined in the removable grill plate and extending substantially perpendicular to the plurality of primary ridges, and
a removable cover configured to extend over the grease trap, wherein the removable cover includes a plurality of secondary ridges extending upward from an upper surface of the removable cover.

2. The cooking system of claim 1, wherein the grease trap includes at least one primary region extending to a first depth and at least one secondary region extending to a second depth less than the first depth, the at least one secondary region having a downward slope leading to the at least one primary region.

3. The cooking system of claim 2, wherein the at least one secondary region comprises a left secondary region and a right secondary region, and wherein the at least one primary region is disposed between the left secondary region and the right secondary region.

4. The cooking system of claim 1, wherein each of the plurality of secondary ridges is substantially co-linear with one of the plurality of primary ridges.

5. The cooking system of claim 1, wherein the plurality of secondary ridges is substantially coplanar with the primary cooking surface.

6. The cooking system of claim 1, wherein the plurality of primary ridges defines a plurality of primary channels, and wherein the plurality of secondary ridges defines a plurality of secondary channels.

7. The cooking system of claim 6, wherein the plurality of primary channels and the plurality of secondary channels define a plurality of gaps leading to the grease trap.

8. The cooking system of claim 1, wherein a cross-section of the grease trap is substantially U-shaped.

9. The cooking system of claim 1, wherein the plurality of primary ridges define at least one ledge, and wherein the upper surface of the removable cover is substantially co-planar with the primary cooking surface when the removable cover is disposed on the at least one ledge.

10. The cooking system of claim 1, wherein the removable grill surface includes a wall extending around a perimeter thereof.

11. The cooking system of claim 10, wherein the wall includes at least one handle thereon.

12. A cooking system, comprising:
a housing;
at least one heating element disposed in the housing; and
a removable grill surface disposed in the housing and in thermal communication with the at least one heating element, the removable grill surface including
a primary cooking surface including a plurality of parallel primary channels defined therein and extending to a first depth,
a grease trap defined in the removable grill surface and extending to a second depth greater than the first depth, the grease trap extending substantially perpendicular to the plurality of parallel primary channels, and
a removable cover configured to be disposed over a recess of the grease trap such that an upper surface of the removable cover is substantially even with the primary cooking surface, wherein the removable cover includes a plurality of secondary ridges extending upward from the upper surface of the removable cover.

13. The cooking system of claim 12, wherein the grease trap includes at least one primary region extending to a first depth and at least one secondary region extending to a second depth less than the first depth, the at least one secondary region having a downward slope leading to the at least one primary region.

14. The cooking system of claim 12, wherein each of the plurality of secondary ridges is substantially co-linear with one of the plurality of primary ridges.

15. The cooking system of claim 12, wherein the plurality of secondary ridges is substantially coplanar with the primary cooking surface.

16. The cooking system of claim 12, wherein the plurality of primary ridges defines a plurality of primary channels, and wherein the plurality of secondary ridges defines a plurality of secondary channels.

17. The cooking system of claim 16, wherein the plurality of primary channels and the plurality of secondary channels define a plurality of gaps leading to the grease trap.

* * * * *